(12) United States Patent
Gaiser

(10) Patent No.: US 10,077,696 B2
(45) Date of Patent: Sep. 18, 2018

(54) EXHAUST SYSTEM WITH REACTIVE HEATING SYSTEM

(75) Inventor: Gerd Gaiser, Reutlingen (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 1371 days.

(21) Appl. No.: 13/186,090

(22) Filed: Jul. 19, 2011

(65) Prior Publication Data

US 2012/0017569 A1 Jan. 26, 2012

(30) Foreign Application Priority Data

Jul. 22, 2010 (DE) .................. 10 2010 031 852

(51) Int. Cl.
| | |
|---|---|
| *F01N 3/08* | (2006.01) |
| *F01N 3/20* | (2006.01) |
| *F24J 1/00* | (2006.01) |
| *F28D 7/10* | (2006.01) |
| *F28D 20/00* | (2006.01) |

(52) U.S. Cl.
CPC ............. *F01N 3/2006* (2013.01); *F24J 1/00* (2013.01); *F28D 7/106* (2013.01); *F28D 20/003* (2013.01); *F01N 2240/12* (2013.01); *F01N 2470/24* (2013.01); *F28F 2225/00* (2013.01); *F28F 2265/26* (2013.01); *Y02A 50/2322* (2018.01); *Y02E 60/142* (2013.01); *Y02T 10/26* (2013.01)

(58) Field of Classification Search
CPC .. F01N 3/2006; F01N 3/2839; F01N 2240/12; F01N 2470/24; F24J 1/00; F28D 20/003; F28D 7/106; F28F 2225/00; F28F 2265/26; Y02E 60/142; Y02T 10/26
USPC ................ 60/274, 295, 300, 303, 320
See application file for complete search history.

(56) References Cited

U.S. PATENT DOCUMENTS

| | | | | |
|---|---|---|---|---|
| 3,947,545 | A * | 3/1976 | Ishida et al. ............... | 423/213.7 |
| 3,948,611 | A * | 4/1976 | Stawsky ............ | B01D 53/9454 |
| | | | | 422/179 |
| 4,022,019 | A * | 5/1977 | Garcea .................. | F01N 13/102 |
| | | | | 138/122 |
| 4,991,644 | A * | 2/1991 | Miaoulis et al. ............... | 165/52 |
| 5,653,106 | A * | 8/1997 | Katashiba et al. .............. | 60/300 |
| 5,874,153 | A * | 2/1999 | Bode ........................ | B32B 3/28 |
| | | | | 427/318 |
| 6,187,273 | B1 * | 2/2001 | Gaiser ........................... | 422/173 |

(Continued)

FOREIGN PATENT DOCUMENTS

| | | |
|---|---|---|
| DE | 4109227 A1 | 9/1992 |
| DE | 4132440 A1 | 5/1993 |
| DE | 19617190 A1 | 11/1997 |

(Continued)

*Primary Examiner* — Laert Dounis
*Assistant Examiner* — Matthew T Largi
(74) *Attorney, Agent, or Firm* — Reinhart Boerner Van Deuren P.C.

(57) ABSTRACT

The invention relates to a system component of an exhaust system for a combustion engine, more preferably of a motor vehicle, with at least one component portion having a closed hollow space structure (2), wherein walls of the closed hollow space structure (2) enclose a reaction chamber (5), in which at least one stationary system component (6) of a reactive heating system is arranged. By using a reactive heating system a rapid heating-up of at least one system component of the exhaust system is advantageously possible.

5 Claims, 2 Drawing Sheets

(56) References Cited

U.S. PATENT DOCUMENTS 7,509,799 B2 * 3/2009 Amou et al. .................. 60/286

FOREIGN PATENT DOCUMENTS

| DE | 102004052107 A1 | | 5/2006 | | |
|---|---|---|---|---|---|
| DE | 102005031068 A1 | | 12/2006 | | |
| EP | 1967713 A1 | * | 9/2008 | ............. | F01N 13/10 |
| FR | 2939471 A3 | | 6/2010 | | |
| JP | S59208118 A | | 11/1984 | | |
| JP | 05125929 A | * | 5/1993 | ............... | F01N 3/20 |
| JP | H0538314 U | | 5/1993 | | |
| JP | 7-180539 A | | 7/1995 | | |
| JP | 9-13960 A | | 1/1997 | | |

* cited by examiner

EXHAUST SYSTEM WITH REACTIVE HEATING SYSTEM

CROSS-REFERENCE TO RELATED PATENT APPLICATIONS

This patent application claims the benefit of German Patent Application No. 10 2010 031852.3, filed Jul. 22, 2010, the entire teachings and disclosure of which are incorporated herein by reference thereto.

FIELD OF THE INVENTION

The present invention relates to a system component of an exhaust system for a combustion engine, particularly of a motor vehicle. A further subject of the invention is an exhaust system with at least one system component. In addition, the invention relates to the use of such a reactive heating system for heating at least one such system component of such an exhaust system. The invention likewise relates to a method for heating-up at least one such system component of such an exhaust system.

BACKGROUND OF THE INVENTION

In cold starting mode the exhaust system of a combustion engine is usually at ambient temperature. In the temperature range of the ambient temperature however catalytic system components of the exhaust system such as for example an oxidation catalytic converter or a nitric oxide storage catalytic converter as well as an SCR (selective catalytic reduction) catalytic converter are at a temperature level at which the respective catalytic system component cannot develop its function or at least only to a very limited extent. In order for the catalytic system components to become catalytically active, these have to be heated up through the hot exhaust gas flow. The exhaust system itself, however, with its system components, constitutes a thermal ballast in a manner of speaking, since the cold exhaust system cools down the exhaust gas flow even with optimum insulation. Accordingly, the temperature of the respective catalytic system component will increase the slower the further it is positioned in the direction of the end of the exhaust system.

In addition, the exhaust gas temperature even in low load ranges of the combustion engine can at least at times lie below the working temperature range of the respective catalytic system component, so that in this case a cooling-down of the catalytic system component below its working temperature range through the exhaust gas is possible.

These problem definitions with respect to the desired working temperature range of catalytic system components exemplarily described above can only be partially compensated for through an optimum insulation of the exhaust system or its system components.

Because of the catalytic system components not being active, the exhaust emission values that occur there are not tolerable and an immediate heating-up for example in cold starting mode is desirable and for example in a low load range, additional heating-up at least of the catalytic system components advantageous.

There is, therefore, an increasing need for possibilities of bringing the catalytic system components of an exhaust system up to working temperature as quickly as possible and/or to accurately and constantly maintain a working temperature range of a catalytic system component.

Accordingly, the present invention deals with the problem of stating an improved or at least an alternative embodiment for an exhaust system, its system components as well as for an associated operating method and for the use of a reactive heating system, which is more preferably characterized by a rapid heating-up behaviour of the exhaust system and/or its more preferably catalytic system components.

According to the invention, this problem is solved through the subjects of the independent Claims. Advantageous embodiments are the subject of the dependent Claims.

SUMMARY OF THE INVENTION

The invention is thus based on the general idea of equipping an exhaust system or a system component of an exhaust system for a combustion engine, particularly of a motor vehicle, with at least one system portion or component portion having a closed hollow space structure, wherein walls of the closed hollow space structure enclose a reaction chamber, and arranging at least one stationary system component of a reactive heating system in the closed hollow space structure.

There, a reactive heating system comprises a stationary and a mobile system component which in the reaction chamber react with each other in an exothermic reaction subject to the release of reaction heat.

Because of the equipping of the exhaust system or at least of one of its system components with a reactive heating system does a rapid heating-up of at least one such more preferably catalytic system component succeed. As a result, the working temperature or the working temperature range of the respective catalytic system component is rapidly reached and the exhaust emission values can thus be significantly lowered.

There, the entire exhaust system, a system portion of the exhaust system, a system component of the exhaust system and/or a component portion of the system component can be equipped with such a hollow space structure equipped with at least one stationary system component of a reactive heating system. Accordingly, the positioning of such a hollow space structure can be carried out for example in or on a manifold, a charging device, a primary pipe, an oxidation catalytic converter, a diesel particle filter, an exhaust pipe, an HWL (urea-water solution) metering device, an SCR (selective catalytic reduction) catalytic converter, an NSK (NOX storage catalytic converter), a rear exhaust pipe, connecting lines, non-return valves or the like.

The hollow space structure is of a closed design and consequently a substance exchange with the surroundings is prevented through the walls of the hollow space structure or prevented up to a negligible degree. The walls of the hollow space structure enclose a reaction chamber in which the system components of a reactive heating system can react with one another in an exothermic reaction. The hollow space structure can be designed as double-walled casing, wherein such a double-walled casing can be arranged only in part regions of the respective system component. There, the double-walled casing need not necessarily surround the respective system component in circumferential direction in a closed manner, not even partially. Thus, an only partial arrangement of such a double-walled casing is possible also in circumferential direction.

Preferably, such a double-walled casing is employed with exhaust pipe portions and/or with a catalytic system component and with substantially cylindrical exhaust system components. Particularly preferably, double-walled casings are employed with walls of catalytic system components, such as for example a catalytic converter, for example NSK or SCR, a diesel particle filter, an HWL metering device and/or an FP system component as well as with pipes and pipe portions.

The double-walled casing can be designed in different ways. Preferably, a supporting type or supporting housing is at least partially surrounded inside and/or outside by a wall more preferably shaped from metal sheet. Between the housing or pipe and the wall the evacuatable intermediate space is then formed. The wall positioned inside and/or outside is connected to the pipe or housing through welding, seaming, folding or the like so that the intermediate space is embodied pressure-tight. The double-walled casing is thus formed through the housing or the pipe together with the wall.

Likewise preferably, the pipe or housing inside and/or outside can be at least partially surrounded by a particularly non-supporting, double-walled shell. This double-walled shell can likewise be connected to the pipe or housing through welding, seaming, folding or the like. There, the intermediate space is arranged and embodied pressure-tight between the walls of the double-walled shell. The double-walled casing in this case is formed through the double-walled shell.

Furthermore, the design of the intermediate space between two supporting housing walls and/or pipes is also conceivable, wherein the housing walls or pipes are closed together in a pressure-tight manner through welding, seaming, flanging or the like. In this case, the double-walled casing is formed through the housing walls and/or pipes.

Likewise preferably, the hollow space structure is designed as a vessel which is arranged in and/or on the respective system component.

In addition, the hollow space structure can be preferably designed as a closed channel system. Such a channel system can be formed as a pipeline system or for example as a system of a plurality of closed channels in the interior of a catalytic converter substrate.

Preferably, the hollow space structure is designed as gap housing, wherein the reaction chamber in this case is formed through the gap of the gap housing. Such a formation of the hollow space structure through a gap housing substantially corresponds to a double-walled construction.

Preferably, the hollow space structure designed as gap housing is used with catalytic system components, with a diesel particle filter, with an SCR catalytic converter, with an HWL metering device, with a fuel processor and/or with a fuel injector.

In the case of the design of the hollow space structure in the manner of a pipeline system the pipeline system can be additionally provided with a heating plate, which because of the contact with the pipeline system is heated up by said pipeline system and because of the enlarged surface area makes possible a greater emission of heat. Such a heating plate can be arranged in or outside on a system component. Preferably, such a heating plate is used with catalytic system components, a diesel particle filter, an SCR catalytic converter inside the system component. In the case of an SCR mixing device, such a heating plate is preferably designed integrally with the SCR mixing device. Such a pipeline system with heating plate can be called a reactive heating element.

A pipeline system having a plurality of windings can be formed into a heating register, which is preferably used in the intake tract of the combustion engine.

In addition, gap-shaped hollow space structures are preferably positioned in the region of the cylinder head and/or of the intake tract. Furthermore, a heating register is likewise preferably arranged in the climate box of the heating system.

The walls of the hollow space structure and/or the heating plate are preferably formed from metal. Particularly preferred as metal materials are aluminium, aluminium alloys, iron, iron alloys, steel and steel alloys.

Preferably, the hollow space structure comprises stabilizing structures. Thus, mechanically stabilizing inserts are preferably arranged within the hollow space structure, such as for example corrugated metal sheets, perforated corrugated metal sheets, dimples, webs or other spacing elements. Fibre structures, open porous or closed porous foams or the like can also be used as spacer elements.

In addition, at least one wall of the hollow space structure can be formed in a corrugated manner. Because of the corrugated formation, offsetting of the heat expansion is possible. Because of this, at least the wall of corrugated design, can be more flexibly installed and more degrees of freedom in the design of the exhaust system are available.

Preferably, such a corrugated wall is used in the case of a double-walled casing.

The reactive heating system comprises at least one mobile and at least one stationary system component as well as a plurality of design elements such as for example the reaction chamber. The reactive heating system fundamentally works based on the exothermic reaction of the at least one mobile system component with the at least one stationary reaction component in the reaction chamber. Because of the reaction heat being liberated through the exothermic reaction such a reactive heating system can be utilised for heating-up at least one system component. In terms of the invention, such an exothermic reaction between the at least two system components is designed largely reversibly.

Such a mobile system component of the reactive heating system in the unbound, stocked state is present in liquid and/or gas or vapour form. In the expelled state the mobile system component is present in the form of gas or vapour. The stationary system component is arranged in the reaction chamber or in the hollow space structure and in the bound as well as in the unbound state.

Preferably, the stationary system component is arranged as fill and/or structured shaped body or as monolithic shaped body in the reaction chamber or in the hollow space structure. Particularly preferably, at least one wall of the hollow space structure is coated with the stationary system component. Preferably, a spacer element of the hollow space structure, such as for example a fibre material, an open porous foam or the like can be additionally or alternatively coated with at least one stationary system component. Very particularly preferably an open porous foam is positioned within the hollow space structure, which at least partially consists of the mobile system component.

Fundamentally, the reactive heating system comprises the design elements reaction chamber, storage device and a connecting line fluidically connecting the reaction chamber with the storage device. In the reaction chamber at least one stationary system component is arranged, while the storage device serves for the storage of the at least one unbound mobile system component. Through the connecting line the reaction chamber can be fed with the at least one mobile system component from the storage device. In addition, a metering device can be arranged in the connecting line with which the feed of the at least one mobile system component to the reaction chamber can be metered or controlled. The metering device can be designed as pump, as control valve, injection device or the like. In addition, the non-return device such as for example a non-return valve can be particularly preferably positioned after the metering device and very particularly preferably before the metering device, which non-return valve prevents a return of the mobile component from the reaction chamber into the storage device at least during the addition of the mobile system component.

Preferably, a condensation cooler is arranged in the connecting line which liquefies the gaseous or vaporous mobile system component. Particularly preferably, the condensation cooler is positioned in a separate connecting line.

The connecting line is preferably designed as pipeline. Preferably, the connecting line is formed from plastic, particularly preferably from metal and very particularly preferably from metal in certain regions.

The storage device is preferably designed as closed collection vessel, which is preferably produced from plastic and very particularly from metal. In the case of the metal design, a design from aluminium or from an aluminium alloy is particularly preferred.

In a first temperature range the reaction giving off the exothermic reaction heat can be started in the reaction chamber through the feeding of the mobile system component from the storage device. In the process, the at least one mobile system component reacts with the at least one stationary system component in a chemical and/or physical reaction into a physical or chemical compound. The reaction heat released in the process can be utilised for heating-up at least one system component of the exhaust system. The first temperature range is preferably arranged below 50° C., particularly preferably below 100° C. and very particularly preferably below the working temperature of the respective, particularly catalytic system component. There, the first temperature range relates to the temperature of the exhaust gas and/or of the temperature of the respective system component.

The physical or chemical compound formed because of the exothermic reaction is formed in a reversible exothermic reaction, so that within a second temperature range as a result of a decomposition reaction the splitting of the physical or chemical compound into the at least one mobile and at least one stationary system component succeeds. This decomposition reaction likewise occurs in the reaction chamber, it is endothermic and draws the required reaction energy from the waste heat of the exhaust gas flow.

The mode of operation of the reactive heating system can be rudimentarily subdivided into two phases. In a heating-up phase within a predetermined first temperature range the at least one mobile system component is fed to the reaction chamber via the connecting line and if applicable controlled through the metering device. Because of this, the mobile system component can react with the stationary system component and the reaction heat of this exothermic reaction released in the process utilised for heating-up at least one system component of the exhaust system. In the process, the at least one mobile system component reacts with at least one stationary system component into a chemical or physical compound.

In a regeneration phase within a predetermined second temperature range, which is usually located higher than the first temperature range, the exothermic reaction to the chemical or physical compound can be reversed by means of a decomposition reaction. In this second temperature range the chemical or physical compound is subjected to a splitting in an endothermic reaction into the at least one mobile and at least one stationary system component. In the process, the at least one mobile system component in this predetermined second temperature range is obtained in vaporous and/or gaseous form and can be conducted to the storage device via the connecting line and/or via a separate connecting line.

Preferably, a condensation cooler is arranged in at least one of the connecting lines with which the gaseous or vaporous mobile system component can be liquefied and stored in the storage device in the liquefied state.

Without condensation cooler it is conceivable that the liquification of the mobile system component takes place in the storage device itself, which can be preferably cooled.

If the mobile system component is of a purely gaseous form, the condensation cooler can likewise be omitted and the mobile system component stored under pressure in the storage device by means of a compressor.

Particularly preferably, the quantity of mobile system component is over dimensioned, so that with the once stored quantity of mobile system component a multiple heating-up of at least one system component can be carried out, without a regenerating phase having to necessarily take place between the heating-up phases.

Advantageously, such a reactive heating system is of a regenerative design, which additionally stores a part of the waste heat of the exhaust gas flow in form of chemical and/or physical reaction heat. Accordingly, with such a reactive heating system, no heat loss occurs with respect to the reactive heating system with the combustion engine in the stationary state.

In addition, by using a metering device, the quantity of generated reaction heat can be advantageously controlled for heating-up at least one system component, so that in the case of an over dimensioned storing of the mobile system component a plurality of heating-up phases have to be carried out without having to carry out a regenerating phase between the heating-up phases.

Such a reactive heating system can be of a chemical and/or physical design. An example for a physical design of such a reactive heating system is an adsorptive-reactive heating system. With an adsorptive-reactive heating system at least one adsorbent is used as stationary system component and a liquid or a gas as mobile system component. The reaction occurring upon contact of the mobile system component with the stationary system component is the adsorption.

Adsorption means a surface enrichment of gases or liquids on the surface of a solid body. This adsorption can take place purely physically as well as partially chemically in the manner of a chemisorption. An example for the chemisorption is for example the settlement of double compounds on catalysts containing nickel. Thus, the adsorption need not of necessity occur purely physically, but it can be partially or completely based on chemical laws.

Preferably, zeolite, silicagel, activated charcoal as adsorbent or an activated charcoal designed as molecular sieve as well as bentonite are used. As mobile system component, water, alcohols, hydrocarbons of a mixture of these substances are preferably used.

Furthermore, the adsorptive-reactive system can be of a hydrophile or hydrophobic. In the case of a hydrophile adsorptive-reactive heating system zeolite, more preferably hydrophile, and/or silicagel is used as hydrophile adsorbent. As polar mobile system component, water, alcohol as well as a mixture of polar compounds such as for example water, alcohols, carbonic acids, acidic watery solutions, alkaline watery solutions, ammoniacal watery solutions or the like are used is preferably used.

In the case of a hydrophobic adsorptive-reactive system, hydrophobic zeolite such as for example dealuminized zeolite and/or activated charcoal is preferably used as hydrophobic adsorbent. Preferably, hydrocarbons and mixtures of non-polar compounds are used as non-polar mobile system components.

Preferably, the following adsorptive-reactive heating systems are employed: hydrophile zeolite with water, zeolite with alcohol and zeolite with a water-antifreeze mixture, e.g. water-alcohol mixture.

Particularly preferably, non-combustable adsorbents and/or non-combustable mobile system components are employed.

Particularly preferably, the adsorptive-reactive heating system is of a closed design, so that a substance exchange with the surroundings is prevented. In this case, the system pressure in the cold state at a predetermined temperature of the cold state is equal to the ambient pressure. Particularly preferably, the system pressure in the cold state at a predetermined temperature of the cold state is smaller than the ambient pressure. Preferably, the predetermined temperature of the cold state is between −20° C. and 50° C., particularly preferably between −10° C. and 40° C. and very particularly preferably between 0° C. and 25° C.

Although the embodiments of a physically reactive heating system described above operate on the basis of adsorption processes, embodiments which are based on absorption processes or work with a combination of adsorption and absorption are also possible in principle.

Furthermore, such a reactive heating system can be designed as chemically reactive heating system. In this case, the system components react chemically with one another, wherein because of the chemical reaction a chemical compound is formed. Preferably, the endothermic decomposition reaction of the chemical compound into the individual system components in the process occurs at an exhaust gas temperature and/or system component temperature of 200° C. to 600° C., particularly preferably at 300° C. to 500° C. and very particularly preferably at 400° C. to 500° C.

Preferably, an earth alkali oxide such as for example calcium oxide, barium oxide or strontium oxide, particularly preferably calcium oxide is used as such a chemically reactive heating system as stationary system component and water as mobile system component.

As further chemically reactive heating systems, systems based on a crystal water settlement or crystal water inclusion or based on the particularly complex bonding of carbon monoxide can be preferably used.

Preferably, a reactive heating system is used which comprises a stationary system component and a mobile system component. Particularly preferably, a reactive heating system is used, which comprises at least two stationary system components and one mobile system component. In this case, because of the different reaction of the respective stationary system component with the mobile system component, a different temperature structure is advantageously possible in the respective reaction chamber. Because of this, a different heating-up behaviour in the respective system components or component portions can be created with and the same mobile system component.

Very particularly preferably, a reactive heating system with at least two stationary system components consisting of different materials and with a mobile system component constituting a mixture of a plurality of compounds is used. In this case it is conceivable that because of the reaction of the respective stationary system component with the respective compound of the mobile system components a differentiated temperature structure can likewise be created in the respective system components or component portions. This formation of the reactive heating system with different stationary as well as mobile system components makes possible a spatially flexible heating-up of the system components or of the exhaust system.

Further important features and advantages of the invention are obtained from the subclaims, from the drawings and from the corresponding Figure description by means of the drawings.

It is to be understood that the features mentioned above and still to be explained in the following cannot only be used in the respective combination stated, but also in other combinations or by themselves, without leaving the scope of the present invention.

BRIEF DESCRIPTION OF THE DRAWINGS

Preferred exemplary embodiments of the invention are shown in the drawings and are explained in more detail in the following description, wherein same reference characters refer to same or similar of functionally same components.

It shows, in each case schematically.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
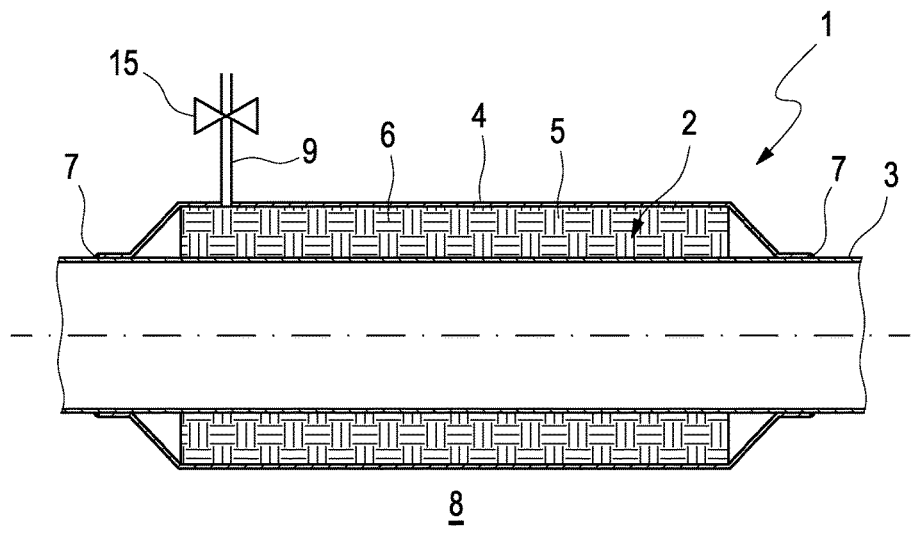
FIG. 1 is a system component of an exhaust system with a hollow space structure filled with a stationary system component.

In FIG. 1 a system component 1 is shown, which comprises a hollow space structure 2. There, the hollow space structure 2 is designed as double-walled casing, wherein a tubular component is surrounded by a shell 4, so that the hollow space structure 2 is formed by the tubular component 3 and the shell 4 surrounding the tubular component 3. A reaction chamber 5 is enclosed by the shell 4 and the tubular component 3, in which reaction chamber 5 a stationary system component 6 is arranged.

The stationary system component 6 can be designed monolithically, as shingling or as shaped body, such as for example a fibre mat. A monolithical design of the stationary system component 6 is possible for example through an open porous foam. There, the stationary system component 6 arranged in the reaction chamber 5 can completely consist of a material or the stationary system component 6 is applied onto a substrate structure of another material.

The shell 4 is connected to the tubular component 3 in a pressure-tight manner via welding points 7 and the reaction chamber 5 such designed in a closed manner, so that between the reaction chamber 5 and the surroundings 8 no or only a negligible substance exchange is possible.

A connecting line 9 is connected to the shell 4 in a pressure-tight manner, which connecting line in turn is fluidically connected to a storage device which is not shown in the FIG. 1, in which the mobile system component of a reactive heating system is stored. The connecting line 9 serves for the feeding of the mobile system component into the reaction chamber 5, so that upon feeding of the mobile system component the latter can react with the stationary system component 6 and because of the exothermic reaction the reaction heat for the heating-up of the system component 1 is released. The connecting line 9 can be controlled with a metering device 15 or with a controllable valve device 15.

Figure 2:
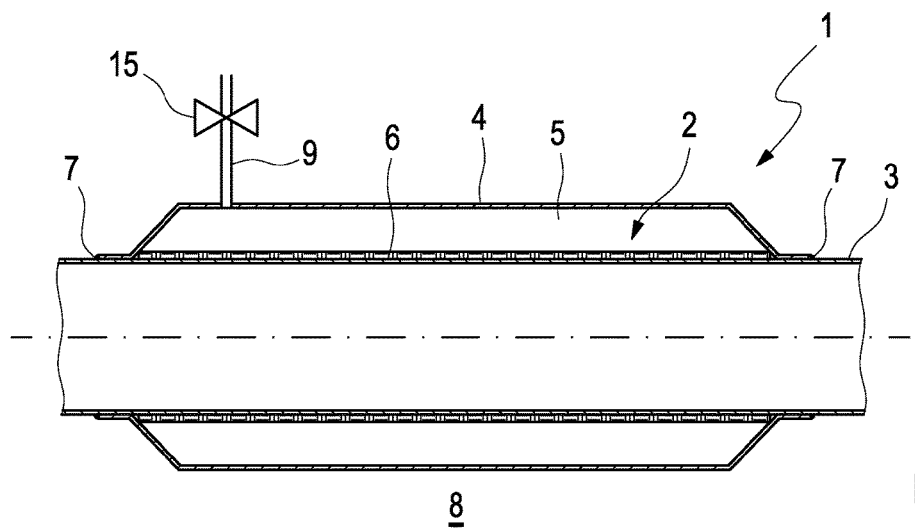
FIG. 2 is a system component with a hollow space structure, wherein on the inside wall of the hollow space structure a stationary system component is applied.

The system component 1, according to FIG. 2, comprises a stationary system component 6 as coating on the tubular component 3. Because of this, the reaction heat that is liberated is advantageously generated directly on the tubular component of the system component 1.

Figure 3:
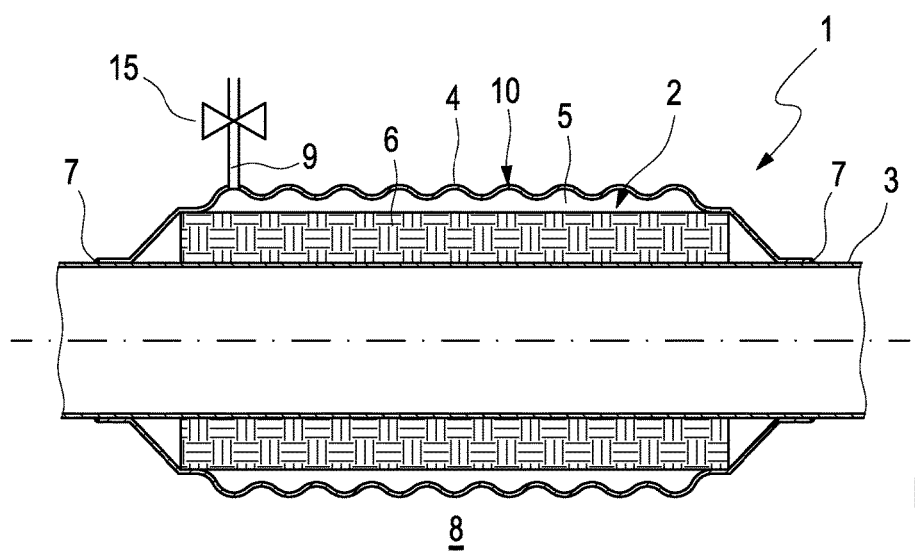
FIG. 3 is a system component with a corrugated wall of the hollow space structure.

The system component 1 shown in FIG. 3 comprises a shell 4 which is equipped with a stabilizing structure 10. This stabilizing structure 10 is designed as corrugated structuring of the shell 4. Because of this elastic shaping of the shell 4 the welding points 7 are subjected to a reduced heat expansion since the corrugated structuring is able to adapt more flexibly relative to the heat expansion than a smooth shell, such as for example shown in FIG. 1 or 2.

Figure 4:
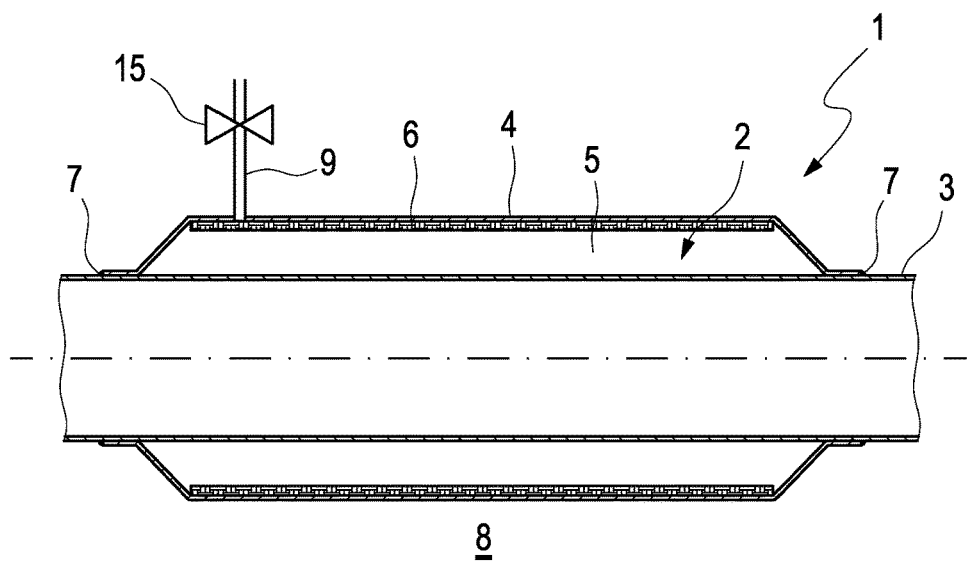
FIG. 4 is a system component with a hollow space structure, wherein on the outside wall of the hollow space structure a stationary system component is applied.

In FIG. 4, a system component 1 is shown, which comprises the stationary system component 6 as inside coating on the shell 4. It is also conceivable, that in addition to the coating of the stationary system component 6 shown in FIG. 4 on the inside on the shell 4 a coating of the stationary system component 6 is arranged on the tubular component 3. In addition to this, a filling of the reaction chamber 5 with a stationary system component 6 would also be conceivable.

Figure 5:
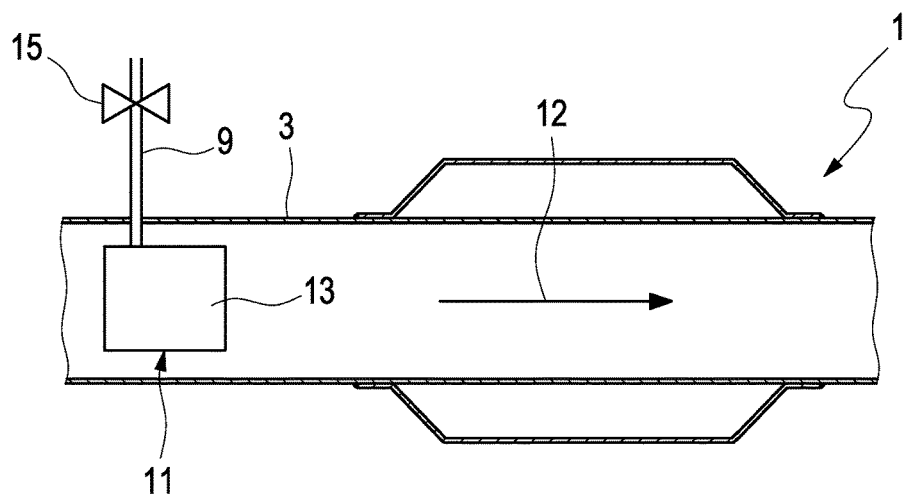
FIG. 5 is a system component with a reactive heating element positioned downstream in front of the system component.

The system component 1 according to FIG. 5 comprises a reactive heating element 11, which in exhaust gas flow direction 12 is arranged in front of the system component 1 in a tubular component 3. The reactive heating element 11 comprises a heating plate 13, with which the heat-emitting surface area can be enlarged, so that a heating-up of the system component 1 takes place more rapidly.

Figure 6:
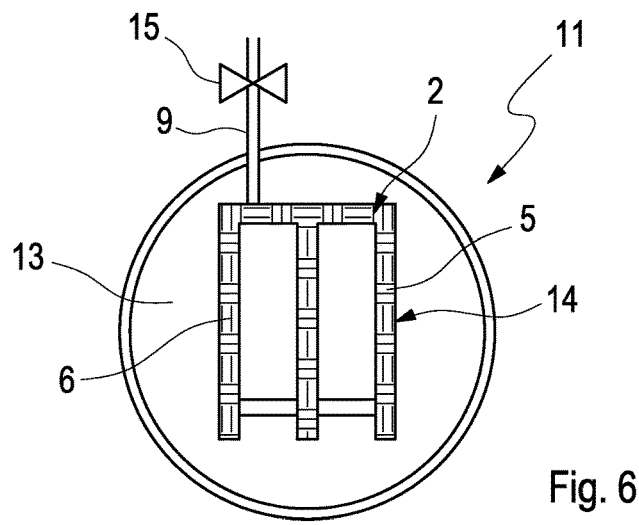
FIG. 6 is a reactive heating element.

The reactive heating element 11 as shown in FIG. 6 comprises a heating plate 13 which is connected with a pipeline system 14, wherein the heating plate 13 and the pipeline system 14 with a view to good heat conductants are likewise interconnected. The pipeline system 14 is connected to the connecting line 9 and in the interior comprises the stationary system component 6. Insofar, the pipeline system 14 forms the hollow space structure 2, whose walls in turn enclose the reaction chamber 5. Such a reactive heating element 11 can alternatively or additionally to a stationary system component 6 be employed as coating in a double-walled casing.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for heating-up at least one system component of an exhaust system for a combustion engine comprising at least one component portion comprising a closed hollow space structure, wherein walls of the closed hollow space structure enclose a reaction chamber, in which at least one stationary system component of a reactive heating system is arranged, wherein the at least one stationary system component is arranged in the reaction chamber, and wherein the at least one stationary system component is arranged in the reaction chamber as a coated solid body, the method comprising:

heating up the least one system component with the reactive heating system comprising the at least one stationary system component and at least one mobile system component, and wherein the step of heating up the at least one system component further comprises the step of obtaining heat for the heating up from a released reaction heat of an exothermic, physical and chemical reaction of the at least one stationary system component and the at least one mobile system component into a physical and/or chemical compound taking place in the reaction chamber of the exhaust system and/or the at least one system component, and wherein the step of obtaining heat from the released reaction heat of the exothermic, physical and chemical reaction comprises the step of conducting the exothermic, physical and chemical reaction with the at least one stationary system component of a zeolite and the at least one mobile system component being water or an alcohol or a mixture of water and an antifreeze agent, wherein within a predetermined first temperature range, the exothermic, physical and chemical reaction into the physical and/or chemical compound takes place, and within a predetermined second temperature range an endothermic decomposition reaction of the physical and/or chemical compound into the at least one stationary system component and the at least one mobile system component takes place.

2. A method for heating-up at least one system component of an exhaust system for a combustion engine comprising at least one component portion comprising a closed hollow space structure, wherein walls of the closed hollow space structure enclose a reaction chamber, in which at least one stationary system component of a reactive heating system is arranged, wherein the at least one stationary system component is arranged in the reaction chamber, and wherein the at least one, the method comprising:
- heating up the at least one system component with the reactive heating system comprising the at least one stationary system component and at least one mobile system component, and
- wherein the step of heating up the at least one system component further comprises the step of obtaining heat for the heating up from a released reaction heat of an exothermic, physical and chemical reaction of the at least one stationary system component and the at least one mobile system component into a physical and/or chemical compound taking place in the reaction chamber of the exhaust system and/or the at least one system component, and
- wherein the step of obtaining heat from the released reaction heat of the exothermic, physical and chemical reaction comprises the step of carrying out the exothermic, physical and chemical reaction with the at least one stationary system component being a potassium oxide and the at least one mobile system component being water or an alcohol or a mixture of water and an antifreeze agent.

3. A method for heating-up at least one system component of an exhaust system for a combustion engine comprising at least one component portion comprising a closed hollow space structure, wherein walls of the closed hollow space structure enclose a reaction chamber, in which at least one stationary system component of a reactive heating system is arranged, wherein the at least one stationary system component is arranged in the reaction chamber, and wherein the at least one stationary system component is arranged in the reaction chamber as a coated solid body, the method comprising:
- heating up the at least one system component with the reactive heating system comprising the at least one stationary system component and an at least one mobile system component, and
- wherein the step of heating up the at least one system component further comprises the step of obtaining heat for the heating up from a released reaction heat of an exothermic, physical and chemical reaction of the at least one stationary system component and the at least one mobile system component into a physical and/or chemical compound taking place in the reaction chamber of the exhaust system and/or the at least one system component, and
- wherein the step of obtaining heat from the released reaction heat of the exothermic, physical and chemical reaction comprises the step of conducting the exothermic, physical and chemical reaction with the at least one stationary system component being a zeolite and the at least one mobile system component being water or an alcohol or a mixture of water and an antifreeze agent,
- wherein the at least one mobile system component is the mixture of water and the antifreeze agent, the antifreeze agent including alcohol.

4. The method of claim 2, wherein the mobile system component is the mixture of water and the antifreeze agent, the antifreeze agent including alcohol.

5. The method of claim 2, wherein the antifreeze agent comprises alcohol.

* * * * *

UNITED STATES PATENT AND TRADEMARK OFFICE
CERTIFICATE OF CORRECTION

PATENT NO. : 10,077,696 B2
APPLICATION NO. : 13/186090
DATED : September 18, 2018
INVENTOR(S) : Gerd Gaiser Page 1 of 1

It is certified that error appears in the above-identified patent and that said Letters Patent is hereby corrected as shown below:

On the Title Page

At item (73), Assignee, delete, "J. Eberspaecher GmbH & Co. KG, Esslingen (DE)" and insert
-- EBERSPAECHER EXHAUST TECHNOLOGY GMBH & CO. KG, NEUNKIRCHEN (DE) --

Signed and Sealed this
Eleventh Day of February, 2020

Andrei Iancu
*Director of the United States Patent and Trademark Office*